(12) United States Patent
I et al.

(10) Patent No.: US 11,984,835 B2
(45) Date of Patent: May 14, 2024

(54) CAMERA MODULE

(71) Applicant: ASAHI KASEI MICRODEVICES CORPORATION, Tokyo (JP)

(72) Inventors: Takahiro I, Tokyo (JP); Arata Kasamatsu, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 17/868,679

(22) Filed: Jul. 19, 2022

(65) Prior Publication Data

US 2022/0360200 A1 Nov. 10, 2022

Related U.S. Application Data

(63) Continuation of application No. 16/681,898, filed on Nov. 13, 2019, now Pat. No. 11,431,269.

(30) Foreign Application Priority Data

Nov. 14, 2018 (JP) .................................. 2018-214181
Sep. 19, 2019 (JP) .................................. 2019-170466

(51) Int. Cl.
| | | |
|---|---|---|
| H02P 6/00 | (2016.01) | |
| G02B 7/02 | (2021.01) | |
| H02K 11/215 | (2016.01) | |
| H02K 41/035 | (2006.01) | |
| H02P 6/16 | (2016.01) | |
| H04N 23/54 | (2023.01) | |
| H04N 23/55 | (2023.01) | |

(52) U.S. Cl.
CPC ............ H02P 6/006 (2013.01); H02K 11/215 (2016.01); H02K 41/0356 (2013.01); H02P 6/16 (2013.01); H04N 23/54 (2023.01); H04N 23/55 (2023.01); G02B 7/02 (2013.01); H02K 2201/18 (2013.01)

(58) Field of Classification Search
CPC .......... H04N 5/23248–2329; G03B 2207/005; G03B 2205/0007–0038; G03B 2205/0069; G02B 27/646; H02K 41/0354–0358; H02P 25/028
USPC ........................... 396/13, 52–55; 348/208.99
See application file for complete search history.

(56) References Cited

U.S. PATENT DOCUMENTS

| | | |
|---|---|---|
| 4,605,286 A | 8/1986 | Sumi |
| 7,620,305 B2 | 11/2009 | Noji |
| 8,818,181 B1 | 8/2014 | Hwang et al. |
| 9,042,042 B2 | 5/2015 | Wade et al. |
| 9,134,587 B2 | 9/2015 | Lim et al. |
| 9,759,928 B2 | 9/2017 | Lim et al. |

(Continued)

FOREIGN PATENT DOCUMENTS

| | | |
|---|---|---|
| JP | S60-000415 A | 1/1985 |
| JP | 2005-234616 A | 9/2005 |

(Continued)

*Primary Examiner* — Xi Wang
(74) *Attorney, Agent, or Firm* — Morgan, Lewis & Bockius LLP

(57) ABSTRACT

A camera module includes a lens, a first magnet and a second magnet mounted on a mobile body including the lens, a coil portion arranged near the first magnet and configured to move the first magnet in a first direction, and the magnetic sensor arranged near the second magnet and configured to detect the position of the second magnet in the first direction as a detection direction.

21 Claims, 11 Drawing Sheets

(56) References Cited

U.S. PATENT DOCUMENTS

| | | |
|---|---|---|
| 9,778,545 B2 | 10/2017 | Wade et al. |
| 10,149,606 B2 | 12/2018 | Iguchi |
| 2005/0179649 A1 | 8/2005 | Fujii et al. |
| 2006/0072913 A1 | 4/2006 | Noji |
| 2008/0177500 A1 | 7/2008 | Yamazaki et al. |
| 2012/0229926 A1 | 9/2012 | Wade et al. |
| 2013/0163085 A1 | 6/2013 | Lim et al. |
| 2014/0354860 A1 | 12/2014 | Yuge et al. |
| 2015/0131153 A1 | 5/2015 | Wade et al. |
| 2016/0004091 A1 | 1/2016 | Lim et al. |
| 2016/0202494 A1 | 7/2016 | Seo et al. |
| 2017/0258303 A1 | 9/2017 | Iguchi |
| 2017/0285363 A1 | 10/2017 | Hu et al. |
| 2018/0067334 A1* | 3/2018 | Gyotoku ............... G01P 3/36 |
| 2018/0217348 A1 | 8/2018 | Han et al. |
| 2018/0275368 A1* | 9/2018 | Lee ...................... G02B 7/09 |
| 2019/0020822 A1* | 1/2019 | Sharma ............ H04N 5/23287 |

FOREIGN PATENT DOCUMENTS

| | | |
|---|---|---|
| JP | 2005-331401 A | 12/2005 |
| JP | 2006-106177 A | 4/2006 |
| JP | 2008-003041 A | 1/2008 |
| JP | 2008-180560 A | 8/2008 |
| JP | 2008-233525 A | 10/2008 |
| JP | 2008-292386 A | 12/2008 |
| JP | 2010-097278 A | 4/2010 |
| JP | 2011-066486 A | 3/2011 |
| JP | 2011-107470 A | 6/2011 |
| JP | 2012-141401 A | 7/2012 |
| JP | 2012-208063 A | 10/2012 |
| JP | 2013-083597 A | 5/2013 |
| JP | 3189365 U | 2/2014 |
| JP | 2014-122864 A | 7/2014 |
| JP | 2016-033480 A | 3/2016 |
| KR | 10-2013-0072721 A | 7/2013 |
| KR | 10-2015-0020950 A | 2/2015 |
| KR | 10-1609351 B1 | 4/2016 |
| WO | 2016/098225 A1 | 6/2016 |

\* cited by examiner

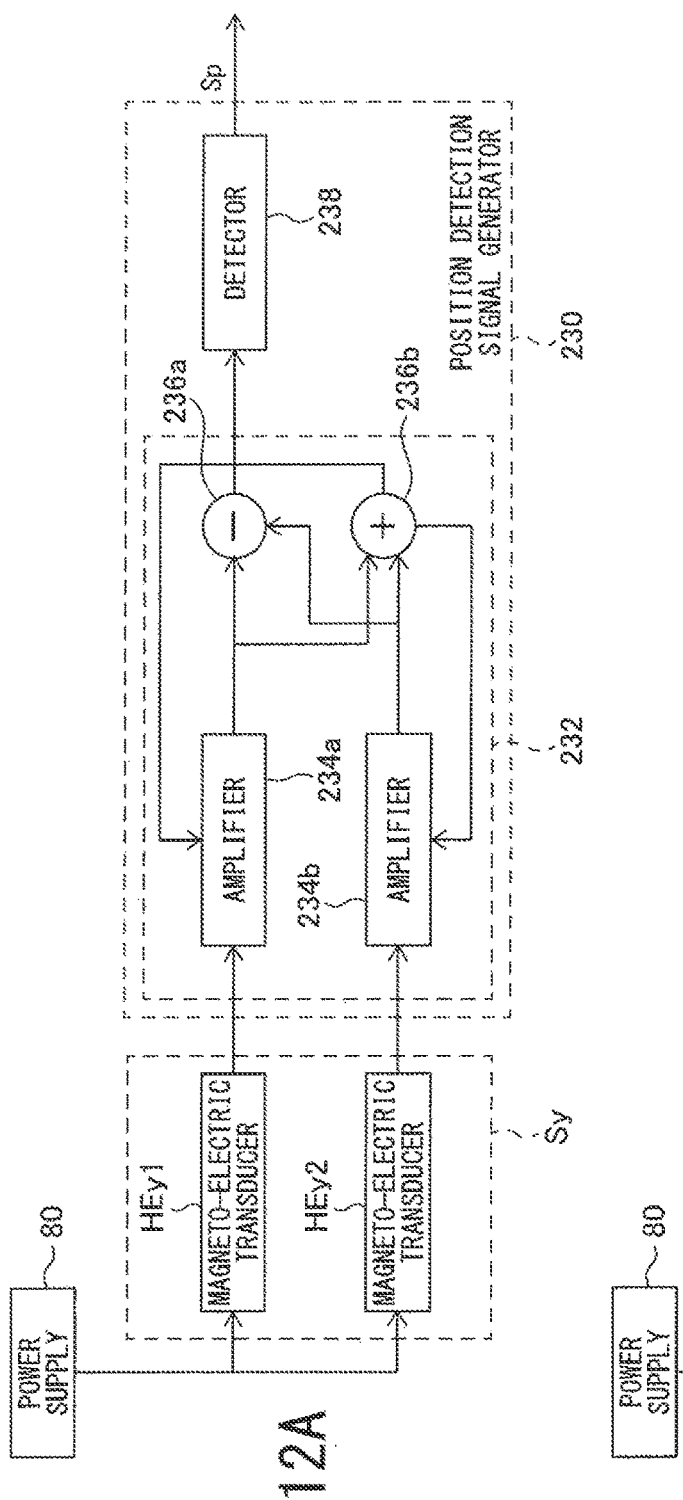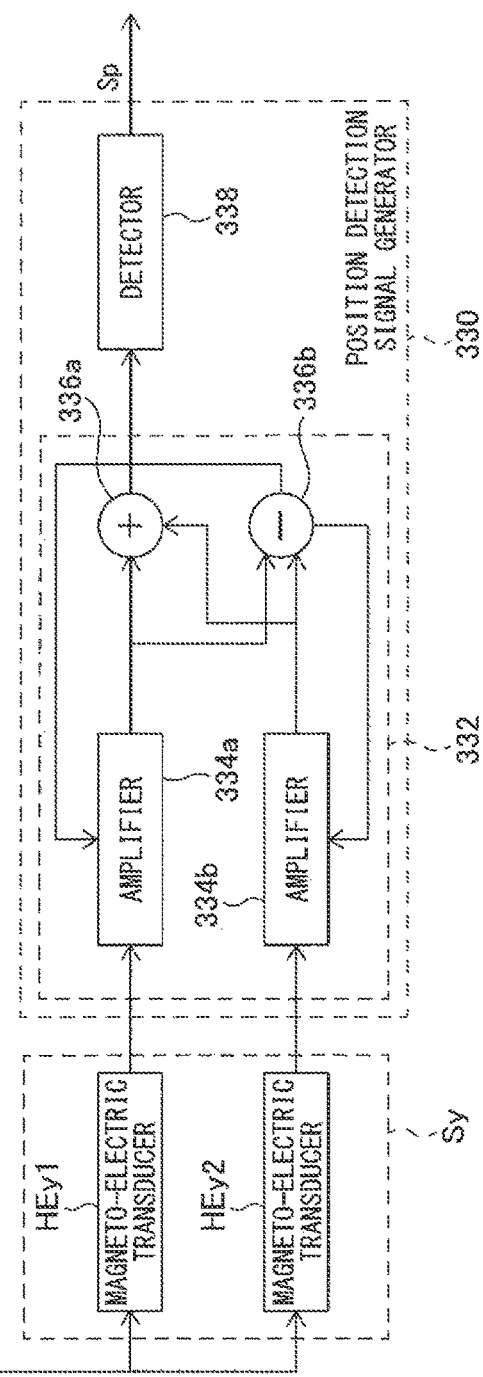

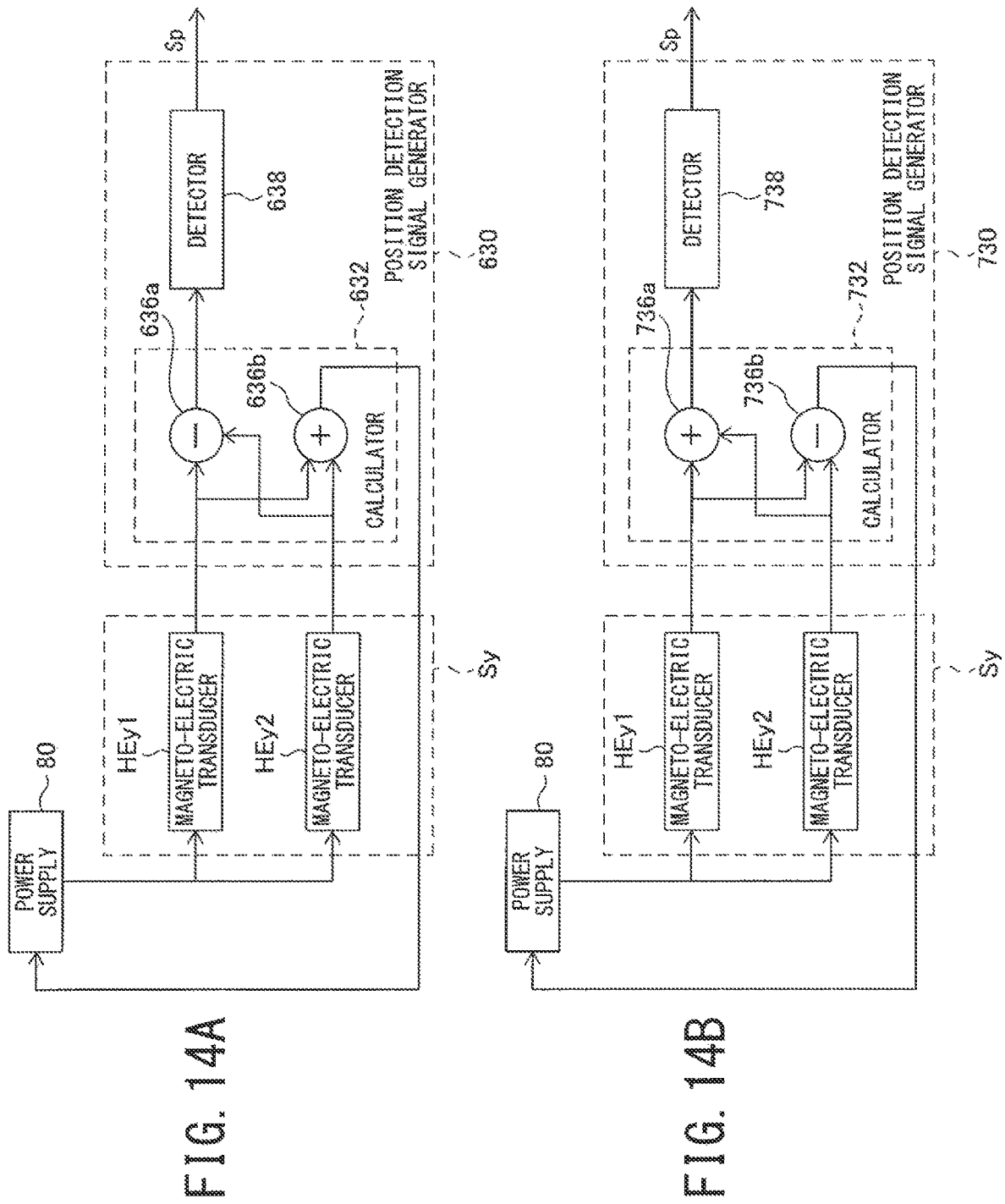

CAMERA MODULE

RELATED APPLICATION DATA

This application is a continuation application of U.S. patent application Ser. No. 16/681,898, filed Nov. 13, 2019, and is based on and claims priority to JP Application No. 2019-170466, filed Sep. 19, 2019, and JP Application No. 2018-214181, filed Nov. 14, 2018, the entire contents of each of these applications are incorporated herein by reference.

TECHNICAL FIELD

The present disclosure relates to camera modules.

BACKGROUND ART

Recent years have seen many terminals such as mobile phones equipped with a mobile camera including a solid-state image sensor such as CCD or CMOS, where it is necessary for an optical system applied to the mobile camera to have a position detecting mechanism capable of instantly performing highly accurate position detection. A position detecting device is known to meet such a need. In the device, the position of a magnet is detected by arranging two magnetic sensors side by side in a direction parallel to the direction of movement of a magnet (for example, see JP3189365U).

SUMMARY

One of an object of the present disclosure is to provide a camera module highly flexible in the arrangement of magnets, coils, and magnetic sensors and capable of detecting the positions of the magnets with high detection accuracy.

To achieve the above object, a camera module according to one aspect of the present disclosure includes a lens, a first magnet and a second magnet mounted on a mobile body including the lens; a coil portion arranged near the first magnet and configured to move the first magnet in a first direction; and a magnetic sensor arranged near the second magnet and configured to detect a position of the second magnet in the first direction as a detection direction.

Additionally, a camera module according to another aspect of the present disclosure includes a lens; a magnet mounted on a mobile body including the lens; a coil portion including two coils arranged near the magnet, the coils being spaced apart from each other along one direction, being arranged such that a winding axis of each of the coils faces a direction perpendicular to the one direction, and moving the magnet in the direction perpendicular to the one direction; a magnetic sensor configured to detect a position of the magnet in the one direction; and a driver configured to drive the coil portion such that the two coils respectively generate magnetic fields having opposite polarities with respect to the magnetic sensor.

According to the one aspect of the present disclosure, the position of the magnet can be detected with high detection accuracy regardless of the direction of movement of the magnet.

BRIEF DESCRIPTION OF DRAWINGS

FIGS. 12A and 12B are circuit block diagrams for each describing a camera module according to another embodiment of the present disclosure;

FIGS. 14A and 14B are circuit block diagrams for each describing a camera module according to another embodiment of the present disclosure.

DESCRIPTION OF EMBODIMENTS

Figure 1A:
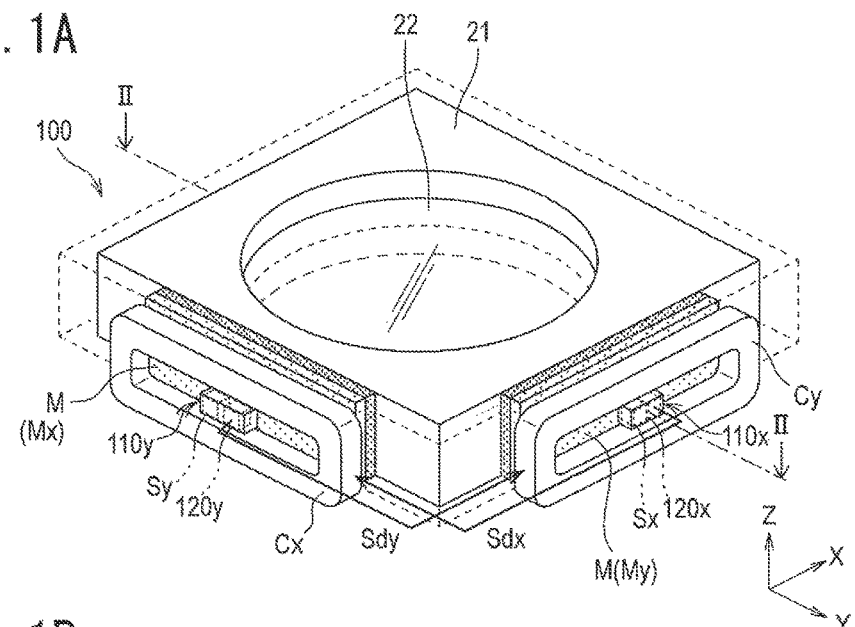
FIGS. 1A and 1B are an external perspective view and a plan view schematically illustrating one exemplary structure of a camera module according to a first embodiment of the present disclosure.

The following detailed description will describe many certain specific structures to provide full understanding of embodiments of the present disclosure. It is however to be understood that such certain specific structures are given for illustrative purposes only and other embodiments are also possible. Additionally, the embodiments given below do not limit the invention according to the claims, and include all of combinations of characteristic structures described in the embodiments.

In the following description, the directions of "left and right" and "up and down" are defined merely for convenience of description and are not intended to limit the technical ideas of the present disclosure thereto. Therefore, for example, it is natural that when the drawing sheet is turned by 90 degrees, "left and right" and "up and down"

should be exchanged one for the other, and that when the drawing sheet is turned by 180 degrees, "left" should become "right" and "right" should become "left".

Hereinafter, a first embodiment of the present disclosure will be described with reference to the drawings. In the description of the drawings below, the same portions are denoted by the same reference signs. However, the drawings are schematic, and the relationship between thicknesses and planar dimensions, the ratios between thicknesses of respective layers, and the like are different from actual ones.

1. First Embodiment

A camera module according to the first embodiment of the present disclosure will be described with reference to FIG. 1A to FIG. 6. A camera module 100 according to the present embodiment is included in a camera function-equipped electronic device. The camera function-equipped electronic device in the present embodiment is, for example, a mobile phone device such as a smart phone, a digital camera, a digital movie, or the like.

[Structure of Camera Module]

Figure 1B:
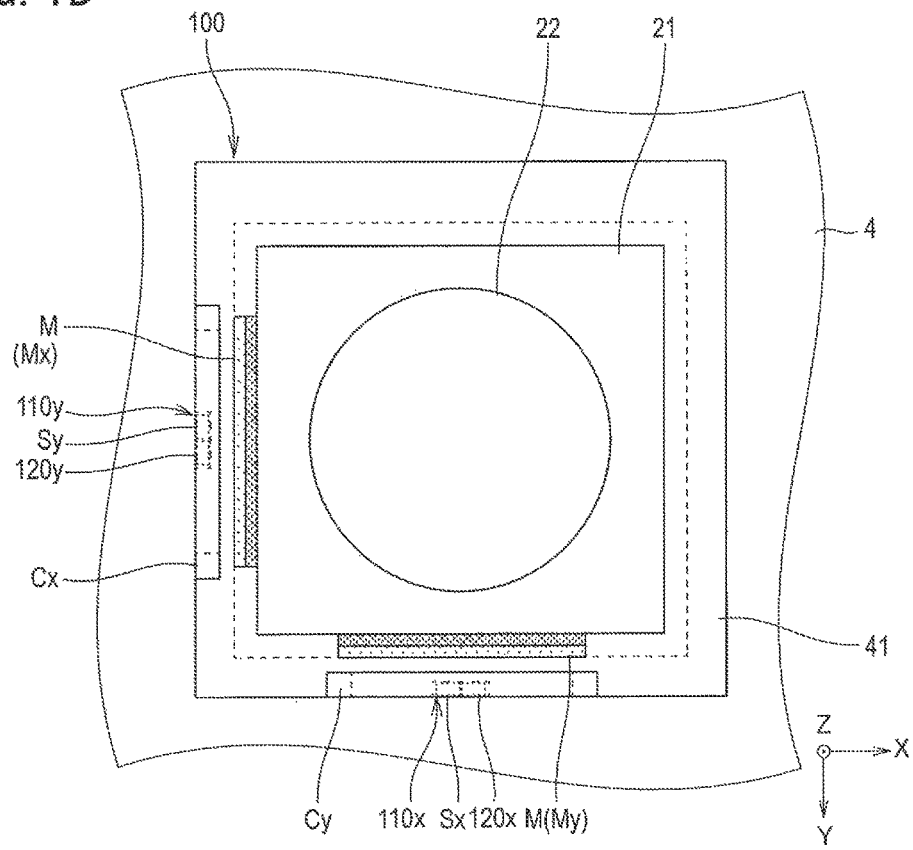
Figure 2:
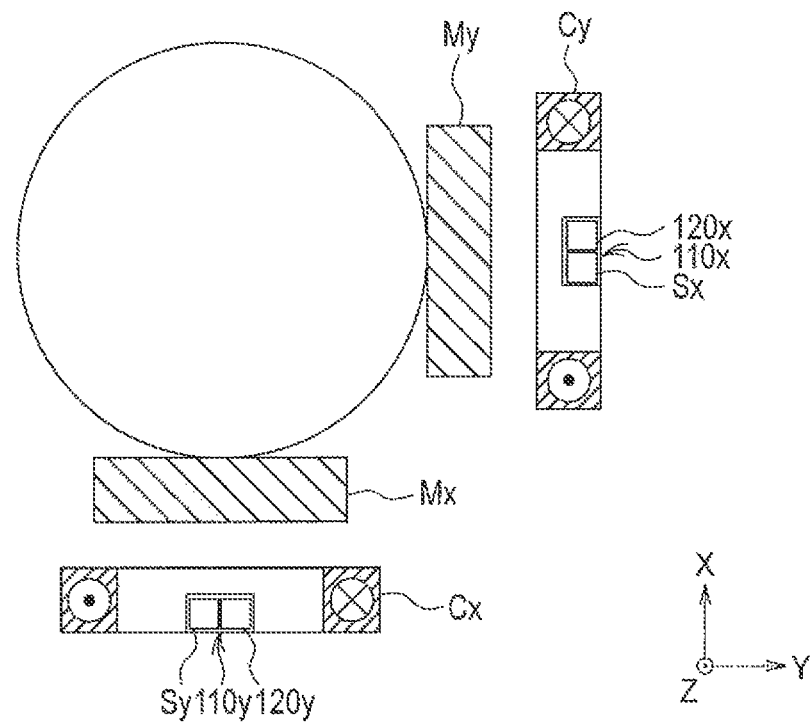
FIG. 2 is a cross-sectional view illustrating the one exemplary structure of the camera module illustrated in FIG. 1.

FIG. 1A is a perspective view illustrating a schematic structure of the camera module 100 included in a camera function-equipped electronic device, and FIG. 1B is a plan view of the camera module 100. FIG. 2 is a cross-sectional view illustrating a cross section taken along line II-II of the camera module 100 illustrated in FIG. 1A. FIG. 1A and FIG. 2 omit illustration of a housing 4 mounted with a device 110$x$ including a magnetic sensor Sx and a device 110$y$ including a magnetic sensor Sy. The device 110$x$ includes the magnetic sensor Sx and a driver 120$x$ configured to control a current to be applied to a coil Cx. Additionally, the device 110$y$ includes the magnetic sensor Sy and a driver 120$y$ configured to control a current to be applied to a coil Cy. Details of the magnetic sensors Sx and Sy, the drivers 120$x$ and 120$y$, and the housing 4 will be described later. In addition, for descriptive convenience, FIGS. 1A and 1B illustrate an XYZ orthogonal coordinate system set to correspond to the camera module 100.

As illustrated in FIGS. 1A and 1B, the camera module 100 includes a lens holder 21 that is a mobile body having a rectangular thin plate shape and a lens 22 mounted in a through hole formed at the center of the lens holder 21. Additionally, under the lens 22, the camera module 100 may include an image sensor (unillustrated), such as a CMOS image sensor, which is electrically coupled to a circuit board.

As illustrated in FIG. 1B, the lens holder 21 is provided on a holder mounting portion 41 of the housing 4 included in the camera function-equipped electronic device. The lens holder 21 is provided on the holder mounting portion 41 so as to be movable with respect to the housing 4. The camera module 100 also functions as a lens actuator module configured to move the lens 22 in a first direction or a second direction.

The camera module 100 includes a magnet M provided at least a part of a periphery of the lens holder 21. The magnet M includes magnets Mx and My. The magnet Mx and the magnet My are attached on side faces of the lens holder 21. The magnet My is arranged on the side face of the lens holder 21 orthogonal to the side face thereof where the magnet Mx is arranged.

As illustrated in FIG. 1B, the devices 110$x$ and 110$y$ are attached to the housing 4.

The device 110$x$ is arranged facing the magnet My, and a coil Cy arranged facing the magnet My is provided around the device 110$x$. The device 110$y$ is arranged facing the magnet Mx, and around the device 110$y$ is provided a coil Cx arranged facing the magnet Mx.

The coil Cx receives a current based on a drive signal Sdx output from the device 110$x$ on the basis of a position detection signal of the magnet My detected by the device 110$x$. The coil Cy receives a current based on a drive signal Sdy output from the device 110$y$ on the basis of a position detection signal of the magnet Mx detected by the device 110$y$.

As illustrated in FIGS. 1A and 1B, at a reference position (a design value) of the lens holder 21, a Z-axis direction of the XYZ orthogonal coordinate system is set to correspond to an optical axis direction of the lens 22. Additionally, at the reference position of the lens holder 21, an XY coordinate plane is set to correspond to a plane orthogonal to the optical axis direction of the lens 22. In the present embodiment, a direction perpendicular to an optical axis of the lens 22 (an X-axis direction in the present embodiment) is set to correspond to the first direction that is a direction in which the magnet Mx is moved by the coil Cx. Additionally, a Y-axis direction perpendicular to the optical axis of the lens 22 and the first direction (the X-axis direction) is set to correspond to the second direction that is a direction in which the magnet My is moved by the coil Cy.

That is, the X-axis direction corresponds to a direction in which the coil Cx and the magnet Mx are arranged facing each other. In other words, the coil Cx and the magnet Mx are arranged so that the direction of the winding axis of the Cx and the direction in which N- and S-poles of Mx are distributed are parallel to each other. Here the X-axis direction corresponds to a direction in which long sides of the magnet My extend. A direction from the coil Cx side to the magnet Mx side (the lens 22 side) is an X-axis positive direction. Furthermore, the Y-axis direction is set to correspond to a direction in which the coil Cy and the magnet My are arranged side by side. In other words, the Y-axis direction corresponds to a direction in which long sides of the magnet Mx extend. A direction from the magnet My side (the lens 22 side) to the coil Cy side is a Y-axis positive direction.

[Operation of Camera Module]

In the camera module 100 of the present embodiment, the position of the lens 22 is determined by detecting the positions of the magnet Mx and the magnet My attached to the lens holder 21. The position of the magnet Mx is detected by the magnetic sensor Sy provided facing the magnet Mx. The position of the magnet My is detected by the magnetic sensor Sx provided facing the magnet My. A method for detecting the positions of the magnet Mx and the magnet My will be described later.

In the camera module 100 of the present embodiment, drive current is applied to the coil Cx arranged near the magnet Mx or the coil Cy arranged near the magnet My to move the magnet Mx or the magnet My. For example, applying drive current to the coil Cx generates a magnetic field around the coil Cx, and in accordance with the direction of the magnetic field, the magnet Mx can be moved in an X-axis positive or negative direction. Similarly, applying drive current to the coil Cy can move the magnet My in a Y-axis positive or negative direction.

Hereinafter, each component of the camera module 100 will be described in detail.

(Magnetic Sensor)

The magnetic sensor Sx is a sensor arranged near the magnet My and configured to detect the position of the magnet My in the X-axis direction as a detection direction.

Additionally, the magnetic sensor Sy is a sensor arranged near the magnet Mx and configured to detect the position of the magnet Mx in the Y-axis direction as a detection direction. The magnetic sensors Sx and Sy are arranged such that the direction of a magnetosensitive axis is perpendicular to each of the X-axis (the first direction) and the Y-axis (the second direction).

As illustrated in FIG. 1B, the magnetic sensor Sx and the magnetic sensor Sy are mounted on the housing 4. Note that the magnetic sensor Sx and the magnetic sensor Sy may be mounted on the holder mounting portion 41. The magnetic sensor Sy (one example of a first magnetic sensor) is arranged facing the magnet Mx. When the magnetic field changes due to movement of the magnet Mx in the Y-axis direction, output voltage of the magnetic sensor Sy changes. The magnetic sensor Sx (one example of a second magnetic sensor) is arranged facing the magnet My. When the magnetic field changes due to movement of the magnet My in the X-axis direction, output voltage of the magnetic sensor Sx changes.

Figure 3:
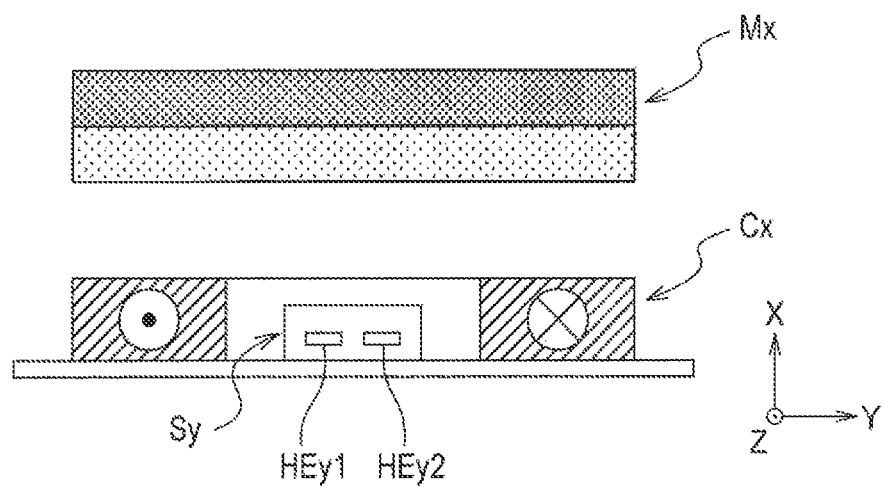
FIG. 3 is a cross-sectional schematic view illustrating the arrangement of a magnet, a coil, and a magnetic sensor in the camera module according to the first embodiment of the present disclosure.

FIG. 3 is a cross-sectional view illustrating in detail a positional relationship between the magnet Mx, the coil portion Cx, and the magnetic sensor Sy. To facilitate understanding, FIG. 3 illustrates only the magnetic sensor Sy, and omits illustrations of the device 110y including the magnetic sensor Sy and the driver 120y included together with the magnetic sensor Sy in the device 110y.

As illustrated in FIG. 3, the magnetic sensor Sy includes two magneto-electric transducers HEy1 and HEy2 arranged along the Y-axis direction (one example of the second direction). In the magnetic sensor Sy, the magneto-electric transducer HEy2 is arranged in a positive direction of the Y-axis direction with respect to the magneto-electric transducer HEy1. The magneto-electric transducers HEy1 and HEy2 are arranged such that when the magnet Mx moves in the Y-axis direction, the sign of a changed amount of a magnetic field detection signal Y1 output by the magneto-electric transducer HEy1 is mutually opposite to the sign of a changed amount of a magnetic field detection signal Y2 output by the magneto-electric transducer HEy2.

Similarly, the magnetic sensor Sx includes two magneto-electric transducers HEx1 and HEx2 (unillustrated) arranged along the X-axis direction (one example of a first direction). In the magnetic sensor Sx, the magneto-electric transducer HEx2 is arranged in the X-axis positive direction with respect to the magneto-electric transducer HEx1. The magneto-electric transducers HEx1 and HEx2 are arranged such that the sign of an amount of change in a magnetic field detection signal X1 output by the magneto-electric transducer HEx1 and the sign of an amount of change in a magnetic field detection signal X2 output by the magneto-electric transducer HEx2 when the magnet My is moved in the X axis direction are opposite to each other.

Figure 4A:
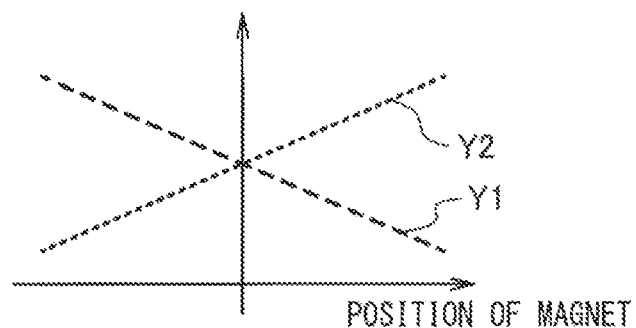
FIG. 4A is a graph illustrating a relationship between a distance of the magnet from a reference position and magnetic fluxes applied to two magneto-electric transducers.

FIG. 4A is a graph illustrating a relationship between the position of the magnet Mx (a distance of the magnet Mx from a reference position) and outputs of the magneto-electric transducers HEy1 and HEy2 of the magnetic sensor Sy. In FIG. 4A, it is assumed that when the distance of the magnet Mx from the reference position is positive, the magnet Mx is positioned in the Y-axis negative direction rather than the reference position.

Figure 4B:
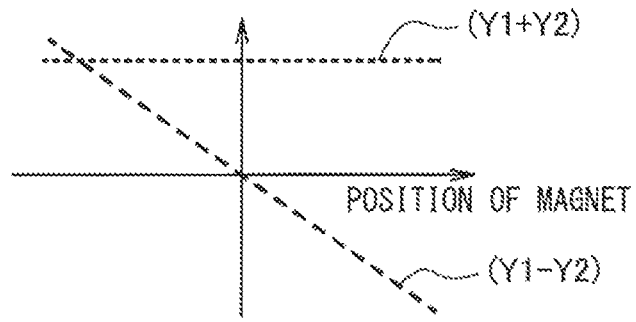
FIG. 4B is a graph illustrating a relationship between the distance of the magnet from the reference position and a sum of and a difference between the magnetic fluxes applied to the two magneto-electric transducers.

Here, in FIG. 4A, the magnetic field detection signal Y1 output by the magneto-electric transducer HEy1 is indicated by a broken line, and the magnetic field detection signal Y2 output by the magneto-electric transducer HEy2 is indicated by a dotted line. In FIG. 4B, a sum signal (Y1+Y2) of the magnetic field detection signal Y1 and the magnetic field detection signal Y2 is indicated by a dotted line, and a difference signal (Y1−Y2) of the magnetic field detection signal Y1 and the magnetic field detection signal Y2 is indicated by a chain line. As illustrated in FIG. 4B, the sum signal (Y1+Y2) is substantially constant regardless of the position of the magnet Mx. On the other hand, as illustrated in FIG. 4B, the difference signal (Y1−Y2) varies in accordance with the position of the magnet Mx. Thus, by arranging the magneto-electric transducers HEy1 and HEy2 as in the present embodiment, a position detection signal indicating the position of the magnet Mx can be obtained on the basis of a ratio of the difference signal (Y1−Y2) to the sum signal (Y1+Y2) (i.e., (Y1−Y2)/(Y1+Y2)). Note that the position detection signal can also be obtained on the basis of a signal corresponding to the ratio of the difference signal to the sum signal). For example, with the use of a ratio signal (Y1/Y2) of the magnetic field detection signal Y1 to the magnetic field detection signal Y2, the position detection signal indicating the position of the magnet Mx can be obtained on the basis of $\{(Y1/Y2)-1\}/\{(Y1/Y2)+1\}$.

In addition, the magnet My, the magnetic sensor Sx (the magneto-electric transducers HEx1 and HEx2), and the coil portion Cy may be arranged similarly to the magnet Mx, the magnetic sensor Sy (the magneto-electric transducers HEy1 and HEy2), and the coil portion Cx in FIG. 3. In this case, a sum signal (X1+X2) of an output X1 of the magneto-electric transducer HEx1 and an output X2 of the magneto-electric transducer HEx2 is substantially constant regardless of the position of the magnet My. On the other hand, a difference signal (X1−X2) varies in accordance with the position of the magnet My. Thus, by arranging the magneto-electric transducers HEx1 and HEx2 as in the present embodiment, a position detection signal indicating the position of the magnet My can be obtained on the basis of a ratio of the difference signal (X1−X2) to the sum signal (X1+X2) (i.e., (X1−X2)/(X1+X2)).

Note that the position detection signal can also be obtained on the basis of a signal corresponding to the ratio of the difference signal to the sum signal). For example, with the use of a ratio signal (X1/X2) of the magnetic field detection signal X1 to the magnetic field detection signal X2, the position detection signal indicating the position of the magnet My can be obtained on the basis of $\{(X1/X2)-1\}/\{(X1/X2)+1\}$.

As the magnetic sensors Sx and Sy, for example, hall sensors can be used that use hall elements as the magneto-electric transducers HEx1, HEx2, HEy1, and HEy2. Alternatively, the magnetic sensors Sx and Sy may be magnetic resistance (MR) sensors or the like using magnetic resistance effect elements (MR elements) as the magneto-electric transducers HEx1, HEx2, HEy1, and HEy2.

(Magnet)

The magnets Mx and My have a rectangular thin plate shape and are formed to have mutually substantially the same size. The magnets Mx and My are dipole permanent magnets having one N-pole and one S-pole. The magnets Mx and My are mounted on at least a part of the periphery of the lens holder 21. The magnet Mx is moved in the X-axis direction by the coil Cx, and, in accordance with the movement of the magnet Mx, the lens 22 is moved in the X-axis direction. Additionally, the magnet Mx moves in the Y-axis direction when the magnet My is moved in the Y-axis direction. The magnet My is moved in the Y-axis direction by the coil Cy, and, in accordance with the movement of the magnet My, the lens 22 is moved in the Y-axis direction. In addition, the magnet My moves in the X-axis direction when the magnet Mx is moved in the X-axis direction.

The magnet Mx is a dipole magnet whose N- and S-poles are distributed in a direction perpendicular to the direction in which the two magneto-electric transducers HEy1 and HEy2 are arranged side by side in the magnetic sensor Sy. Additionally, the magnet My is a dipole magnet whose N- and S-poles are distributed in a direction perpendicular to the direction in which the two magneto-electric transducers HEx1 and HEx2 are arranged side by side in the magnetic sensor Sx. In other words, in FIGS. 1A and 1B, the magnet Mx is formed such that the S-pole is distributed on the lens holder 21 side, and the N-pole is distributed on the magnetic sensor Sy side. In addition, the magnet My is arranged such that the S-pole is distributed on the lens holder 21 side, and the N-pole is distributed on the magnetic sensor Sx side.

As illustrated in FIG. 3, the magnet Mx is arranged such that the same magnetic pole (the N-pole in FIG. 3) faces each of the two magneto-electric transducers HEy1 and HEy2 included in the magnetic sensor Sy. Additionally, the magnet My is arranged such that the same magnetic pole (the N-pole in FIG. 1) faces each of the two magneto-electric transducers HEx1 and HEx2 included in the magnetic sensor Sx.

(Coil)

As illustrated in FIG. 1B, the coils Cx and Cy are mounted on the housing 4. The coil Cx is arranged near the magnet Mx. The coil Cx generates a magnetic field when current supplies thereto, and thereby moves the magnet Mx in the X-axis direction. The coil Cx moves the magnet Mx in the X-axis positive or negative direction in accordance with the direction of a magnetic flux generated around the coil Cx. The coil Cy is arranged near the magnet My. The coil Cy generates a magnetic field when current supplies thereto, and thereby moves the magnet My in the Y-axis direction. The coil Cy moves the magnet My in the Y-axis positive or negative direction in accordance with the direction of a magnetic flux generated around the coil Cy. In other words, the coil Cy can move the magnet My in the direction different from that of the magnet Mx.

The coil Cx is provided around the magnetic sensor Sy and arranged facing the magnet Mx. The coil Cx receives a current based on a detection signal (a signal indicating the position of the magnet My in the X-axis direction) detected by the magnetic sensor Sx. In other words, a current for moving the magnet Mx to a target position in the X-axis direction on the basis of the position of the magnet My in the X-axis direction is supplied to the coil Cx.

The coil Cy is provided around the magnetic sensor Sx and arranged facing the magnet My. The coil Cy receives a current based on a detection signal (a signal indicating the position of the magnet Mx in the Y-axis direction) detected by the magnetic sensor Sy. In other words, a current for moving the magnet My to a target position in the Y-axis direction on the basis of the position of the magnet Mx in the Y-axis direction is supplied to the coil Cy.

As a result, the coil Cx moves the magnet Mx in the X-axis direction on the basis of the position of the magnet My in the X-axis direction detected by the magnetic sensor Sx. In addition, the coil Cy moves the magnet My in the Y-axis direction on the basis of the position of the magnet Mx in the Y-axis direction detected by the magnetic sensor Sy.

(Device)

Figure 5:
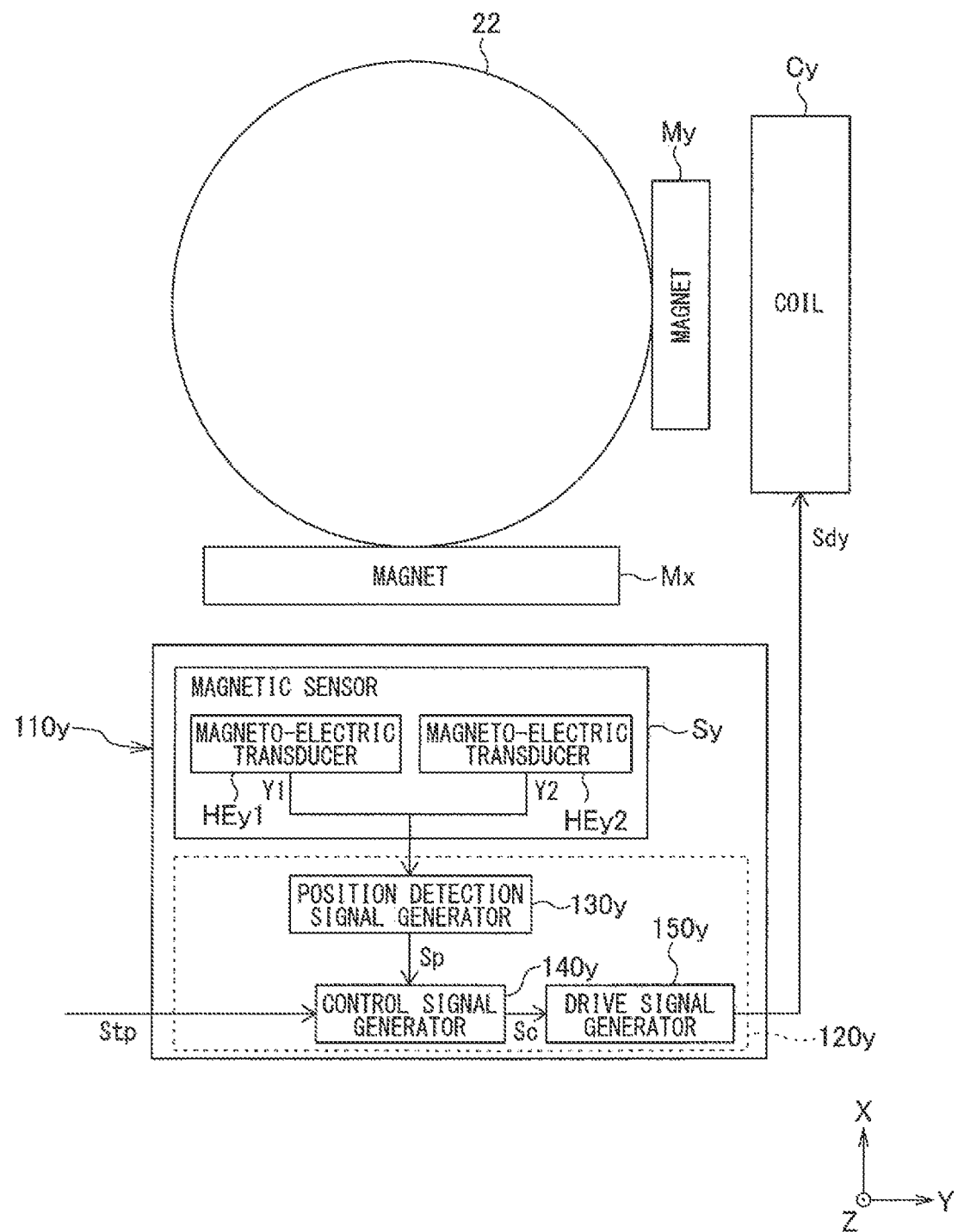
FIG. 5 is a circuit block diagram for describing the camera module according to the first embodiment of the present disclosure.

FIG. 5 is a block diagram illustrating one exemplary structure of the device 110y including the magnetic sensor Sy and the driver 120y configured to move the lens 22 to a target position in the Y-axis direction. The device 110y is formed by integrating the magnetic sensor Sy with at least one of respective units (a position detection signal generator 130y, a control signal generator 140y, and a drive signal generator 150y) forming the driver 120y. The device 110y may be, for example, a monolithic IC in which the magnetic sensor Sy and the driver 120y are formed in or on a single substrate or a hybrid IC in which the magnetic sensor Sy and the driver 120y are connected on a single substrate. Alternatively, in the device 110y, for example, the magnetic sensor Sy and the driver 120y may be integrated into a single package. One example of the device 110y may be, for example, a hall IC or a magnetic resistance (MR) IC.

Hereinafter, operation of the driver 120y will be described with reference to FIG. 5. The driver 120y controls the coil Cy on the basis of the position of the magnet Mx in the Y-axis direction detected by the magnetic sensor Sy. The driver 120y controls the coil Cy to move the magnet My, and thereby moves the lens 22 to a target position in the Y-axis direction. Note that, to facilitate understanding of the control by the driver 120y, FIG. 5 illustrates the lens 22, the magnets Mx and My, and the coil Cy other than the device 110y including the driver 120y.

The driver 120y includes the position detection signal generator 130y configured to detect the position of the magnet Mx in the Y-axis direction, the drive signal generator 150y configured to drive the coil Cy, and the control signal generator 140y configured to control the drive signal generator 150y.

In addition, the camera module 100 includes the device 110x unillustrated in FIG. 5. The device 110x includes the magnetic sensor Sx and the driver 120x configured to move the lens 22 to a target position in the X-axis direction. The driver 120x includes a position detection signal generator 130x, a control signal generator 140x, and a drive signal generator 150x. The device 110x is formed by integrating the magnetic sensor Sx with at least one of the respective units (the position detection signal generator 130x, the control signal generator 140x, and the drive signal generator 150x) forming the driver 120x.

Figure 6:
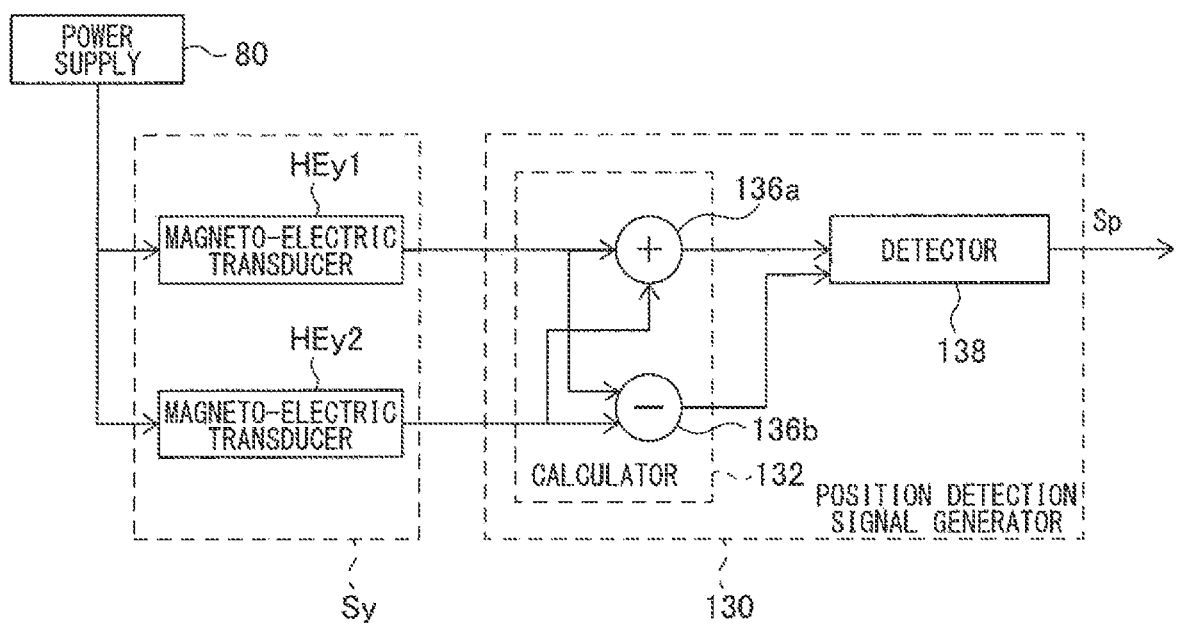
FIG. 6 is a circuit block diagram for describing the camera module according to the first embodiment of the present disclosure in more detail.

Hereinafter, the respective units of the driver 120 will be described in detail. In FIG. 6, the devices 110x and 110y, the drivers 120x and 120y, and the position detection signal generators 130x and 130y will be described as a device 110, a driver 120, and a position detection signal generator 130, without distinguishing each one from the other. Note that a description of the magnetic sensor Sy will be omitted.

(Position Detection Signal Generator)

The position detection signal generator 130 detects the position of the magnet Mx in the Y-axis direction on the basis of the magnetic field detection signals Y1 and Y2 respectively output from the two magneto-electric transducers HEy1 and HEy2 of the magnetic sensor Sy. The position of the magnet Mx in the Y-axis direction is detected on the basis of at least one of a sum signal of, a difference signal between, and a ratio signal between the magnetic field detection signals Y1 and Y2 respectively output by the magneto-electric transducers HEy1 and HEy2.

As illustrated in FIG. 6, the position detection signal generator 130 includes a calculator 132 and a detector 138. Additionally, as illustrated in FIG. 6, the magneto-electric transducers HEy1 and HEy2 are connected to a power supply 80 to receive drive current or drive voltage therefrom. The position detection signal generator 130 may include an AD converter (unillustrated) configured to AD-convert the magnetic field detection signals Y1 and Y2. The AD converter is provided, for example, in the calculator 132.

The calculator 132 includes an adder 136a and a subtractor 136b. The calculator 132 inputs the two magnetic field detection signals Y1 and Y2 respectively output by the two magneto-electric transducers HEy1 and HEy2 to the adder 136a, and outputs the sum signal (Y1+Y2) of the magnetic field detection signals Y1 and Y2 to the detector 138. Additionally, the calculator 132 inputs the magnetic field detection signals Y1 and Y2 to the subtractor 136b, and outputs the difference signal (Y1−Y2) between the magnetic field detection signals Y1 and Y2 to the detector 138.

The detector 138 outputs, as the position detection signal Sp(Spy), for example, the ratio {(Y1−Y2)/(Y1+Y2)} of the difference signal (Y1−Y2) to the sum signal (Y1+Y2) to the control signal generator 140. As described above, the sum signal (Y1+Y2) indicates the substantially constant value regardless of the position of the magnet Mx (see FIG. 4B). Thus, the position detection signal Spy represented by {(Y1−Y2)/(Y1+Y2)} becomes a signal that varies in accordance with the position of the magnet Mx (a relative position with respect to the reference position of the magnet Mx).

(Control Signal Generator)

The control signal generator 140 outputs a control signal Sc(Scy) to control the drive signal generator 150. The control signal generator 140 outputs the control signal Sc(Scy) on the basis of the position detection signal Sp(Spy) indicating the position of the magnet Mx in the Y-axis direction input from the position detection signal generator 130 and a target position signal Stp(Stpy) indicating a target position of the magnet My (the lens 22) in the Y-axis direction. The control signal generator 140 calculates an amount of movement of the magnet My to the target position in the Y-axis direction, for example, from a difference between the target position signal Stp and the position detection signal Sp. The control signal generator 140 outputs the control signal Sc corresponding to the amount of the movement to the drive signal generator 150. Additionally, the control signal generator 140 may use PID control (proportional-integral-derivative controller) to output the control signal Sc to the drive signal generator 150.

(Drive Signal Generator)

The drive signal generator 150 outputs the drive signal Sd(Sdy) to the coil Cy on the basis of the control signal Sc(Scy) input from the control signal generator 140. The drive signal Sd(Sdy) is a signal for applying drive current to the coil Cy. The drive signal generator 150 applies a predetermined drive current to the coil Cy on the basis of the drive signal Sd(Sdy) to generate a magnetic field around the coil Cy and thereby move the magnet My by a predetermined amount in the Y-axis direction. By doing this, the drive signal generator 150 moves the lens 22 (the lens holder 21) mounted with the magnets Mx and My arranged away from each other, in the Y-axis direction.

The description hereinabove has been given of the driver 120 driving the coil Cy on the basis of the detection result of the magnetic sensor Sy. The same also applies to operation of the driver (unillustrated) driving the coil Cx on the basis of the position of the magnet My detected by the magnetic sensor Sx.

[Modifications]

(1) Modification 1

Figure 7:
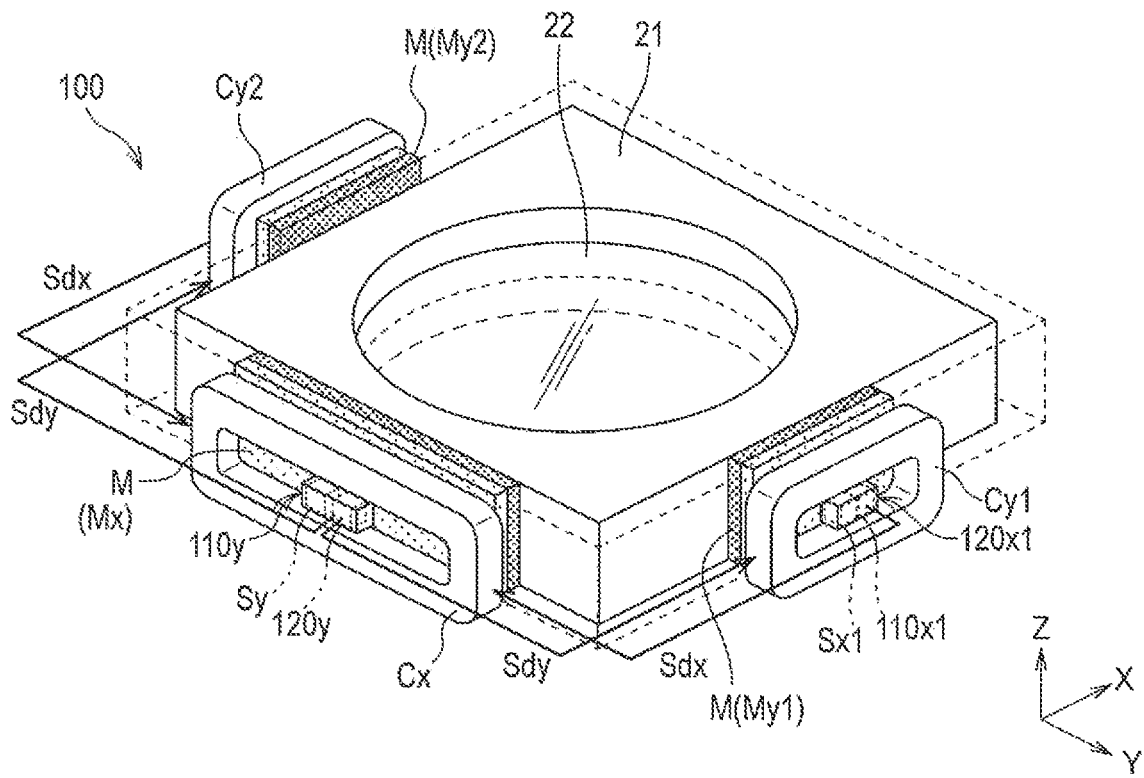
FIG. 7 is an external perspective view schematically illustrating one modification of the camera module according to the first embodiment of the present disclosure.

The camera module 100 according to the present embodiment may be formed, for example, as illustrated in FIG. 7. Specifically, the camera module 100 may include, two coils Cy1 and Cy2, devices 110x1 and 110x2, magnetic sensors Sx1 and Sx2, and magnets My1 and My2 (the device 110x2 and the magnetic sensor Sx2 are unillustrated), instead of each of the coil Cy, the device 110x, the magnetic sensor Sx, and the magnet My. In this case, the device 110y outputs the drive signal Sdy to both of the coils Cy1 and Cy2 from the driver 120y in accordance with a result of detection of the position of the magnet Mx by the magnetic sensor Sy to apply current to the coils Cy1 and Cy2. Additionally, the devices 110x1 and 110x2 output the drive signal Sdx to the coil Cx from each of the drivers 120x1 and 120x2 in accordance with results of detection of the positions of the magnets My1 and My2 by the magnetic sensors Sx1 and Sx2 to apply current to the coil Cx. In FIG. 7, outputs of the drive signals Sdx and Sdy are schematically indicated by arrows.

Additionally, the camera module 100 may include two coils Cx1 and Cx2, devices 110y1 and 110y2, magnetic sensors Sy1 and Sy2, and magnets Mx1 and Mx2, instead of each of the coil Cx, the device 110y, the magnetic sensor Sy, and the magnet Mx.

(2) Modification 2

In the camera module 100 according to the present embodiment, the first direction may be defined as a direction parallel to the optical axis of the lens 22 (i.e., Z-axis direction), and the second direction may be defined as a direction perpendicular to the optical axis thereof (i.e., X-axis direction or Y-axis direction). In this case, arranging a coil Cz, a magnetic sensor Sz, and a magnet Mz under the lens 22 (the lens holder 21) can detect movement of the magnet Mz in the Z-axis direction.

(3) Modification 3

The camera module 100 according to the present embodiment serves to detect movement of the lens 22 in the X-axis direction or the Y-axis direction and control the position of the lens 22 by driving the coils Cx and Cy in accordance with the result of the detection. However, the invention is not limited thereto. For example, the camera module 100 may further include the unillustrated coil Cz and magnet Mz that can move the lens 22 in the Z-axis direction to serve to detect the movement of the lens 22 in the Z-axis direction and control the position of the lens 22 in the Z-axis direction in accordance with the result of the detection.

In this case, the magnet Mz is arranged facing the magnet Mx via the lens holder 21 therebetween. The magnet Mz is provided in the holder mounting portion 41 such that a distance between the magnet Mz and the device 110z is maintained constant even when the lens holder 21 moves in the holder mounting portion 41 provided on the housing 4. The magnet Mz is arranged outside the lens holder 21. The magnet Mz and the lens holder 21 are adapted to be movable independently of each other.

The device 110z (unillustrated) configured to drive the coil Cz is mounted on the housing 4. Around the device 110z is provided the coil Cz arranged facing the magnet Mz. The coil Cz receives a current based on a detection signal detected by the device 110z.

As a result, the camera module 100 can perform not only blur correction within an X-Y plane of the lens 22 but also blur correction in the Z-axis direction and focus correction of the lens 22.

(4) Modification 4

The camera module 100 according to the present embodiment may serve to control the position of the lens 22 in the Z-axis direction, in addition to serving to control the position of the lens 22 in the X-axis direction or the Y-axis direction, as with modification 3.

A camera module 100 of modification 4 includes, for example, three magnets Mx, My, and Mz, three coils Cx, Cy, and Cz, and three devices 110x, 110y, and 110z. In the camera module 100 thus formed, the magnets Mx, My, and Mz are mounted on the lens holder 21, and the coils Cx, Cy, and Cz, respectively, are arranged near the magnets Mx, My, and Mz. The device 110x is arranged, for example, near the coil Cy or Cz, the device 110y is arranged, for example, near the coil Cz or Cx, and the device 110z is arranged, for example, near the coil Cx or Cy.

The magnetic sensor Sx included in the driver 120x detects the position of the magnet My in the X-axis direction as a detection direction. The magnetic sensor Sy included in the driver 120y detects the position of the magnet Mz in the Y-axis direction as a detection direction. The magnetic sensor Sz included in the driver 120z detects the position of the magnet Mx in the Z-axis direction as a detection direction.

The coil Cx is driven by a drive signal from the driver 120x to move the magnet Mx in the X-axis direction as the first direction. The coil Cy is driven by a drive signal from the driver 120y to move the magnet My in the Y-axis direction as the second direction. The coil Cz is driven by a drive signal from the driver 120z to move the magnet Mz in the Z-axis direction as a third direction.

In other words, the camera module 100 of modification 4 includes a first magnet, a second magnet, and a third magnet that are mounted on a mobile body. The coil portion includes a first coil portion configured to move the first magnet in the first direction, a second coil portion configured to move the second magnet in the second direction different from the first direction, and a third coil portion configured to move the third magnet in the third direction different from both the first and second directions. Additionally, the magnetic sensor includes a first magnetic sensor configured to detect the position of the first magnet in the third direction as a detection direction, a second magnetic sensor configured to detect the position of the second magnet in the first direction as a detection direction, and a third magnetic sensor configured to detect the position of the third magnet in the second direction as a detection direction.

In the camera module 100 thus formed, the magnetic sensors Sx, Sy, and Sz are hardly influenced by magnetic fields leaked from the coils Cx, Cy, and Cz for respectively moving the lens 22 in the X, Y, and Z-axis directions. Thus, regardless of the direction of movement of the lens 22, the position of the lens 22 can be detected with higher detection accuracy.

(5) Modification 5

A camera module 100 of modification 5 includes, for example, two magnets Mx and Myz, three coils Cx, Cy, and Cz, and three devices 110x, 110y, and 110z. The magnet Myz is a magnet arranged near both of the coils Cy and Cz and serving as both of the magnets My and Mz described in modification 4. In this respect, it is different from the camera module 100 of modification 4.

The coil Cx is arranged near the magnet Mx, and moves the magnet Mx in the X-axis direction (one example of the first direction). The coil Cy is arranged near the magnet Myz, and moves the magnet Myz in the Y-axis direction (one example of the second direction). The coil Cz is arranged near the magnet Myz, and moves the magnet Myz in the Z-axis direction (one example of the third direction).

In other words, the camera module 100 of modification 5 includes a first magnet and a second magnet mounted on a mobile body. The coil portion includes a first coil portion configured to move the first magnet in the first direction, a second coil portion configured to move the second magnet in the second direction, and a third coil portion configured to move the second magnet in the third direction different from both of the first direction and the second direction. Additionally, the magnetic sensor further includes a first magnetic sensor configured to detect the position of the first magnet in the third direction as a detection direction.

Effects of First Embodiment

The camera module 100 according to the first embodiment has the following effects: (1) The camera module is 100 highly flexible in the arrangement of magnets, coils, and magnetic sensors and capable of detecting the positions of the magnets with high detection accuracy.

2. Second Embodiment

A camera module according to a second embodiment of the present disclosure will be described using FIG. 8 to FIG. 11 while referring to FIG. 6. A camera module 200 according to the present embodiment can detect the position of a magnet with higher detection accuracy than the camera module 100 according to the first embodiment.

In the camera module 100 according to the first embodiment, the magnetic sensors Sy and Sx, respectively, are arranged at centers of the coil s Cx and Cy. Thus, the magnetic sensors Sy and Sx detect not only magnetic fields generated by the magnets Mx and My but also magnetic fields generated by current flow to the coils Cx and Cy. The camera module 200 according to the second embodiment suppresses detection of magnetic fields generated by the current flow to the coils Cx and Cy, and thus detects the position of each of the magnets with higher detection accuracy.

[Structure of Camera Module]

Figure 8:
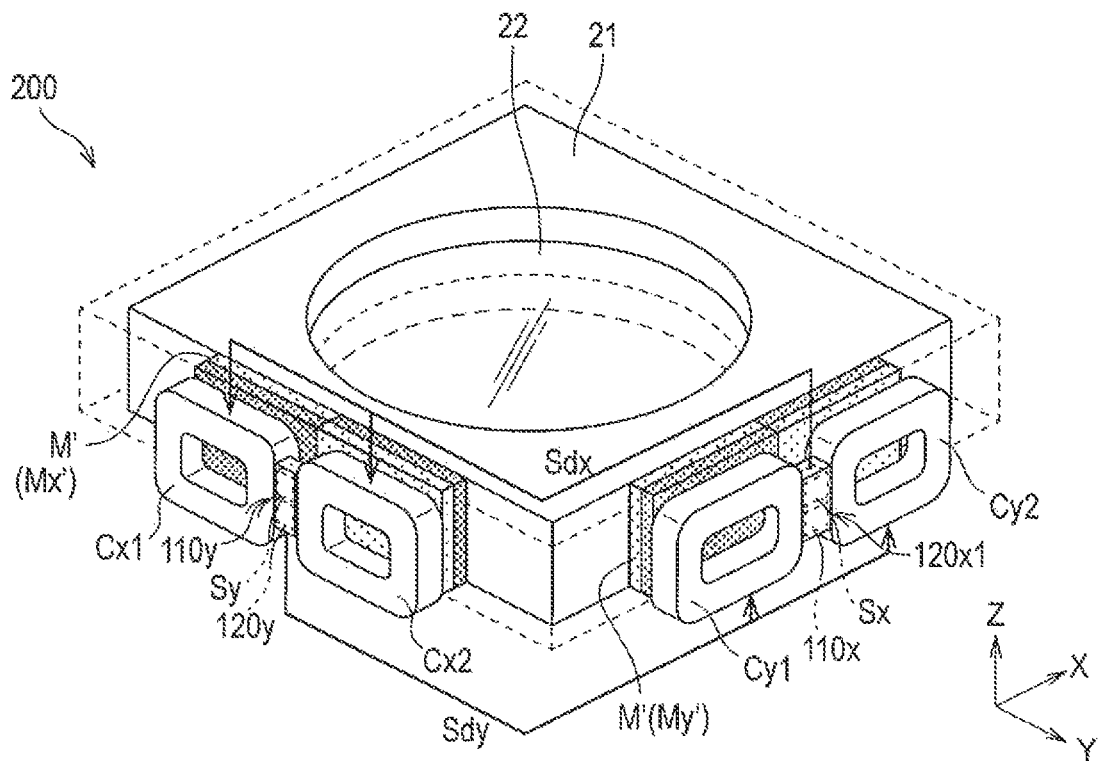
FIG. 8 is an external perspective view schematically illustrating one exemplary structure of a camera module according to a second embodiment of the present disclosure.

As illustrated in FIG. 8, the camera module 200 includes a quadrupole magnet M' (Mx' and My'), coils Cx1, Cx2, Cy1, and Cy2, and devices 110x and 110y. The device 110x includes a magnetic sensor Sx and a driver 120x1, and applies current to the coils Cx1 and Cx2 on the basis of a drive signal Sdx (indicated by arrows in FIG. 8) output from the driver 120 x1. The device 110y includes a magnetic sensor Sy and a driver 120y, and applies current to the coils Cy1 and Cy2 on the basis of a drive signal Sdy (indicated by arrows in FIG. 8) output from the driver 120y. The device 110y including the magnetic sensor Sy is arranged between the two coils Cx1 and Cx2. Additionally, the device 110x including the magnetic sensor Sx is arranged between the two coils Cy1 and Cy2. The camera module 200 also functions as a lens actuator module that moves the lens 22 in the X-axis direction or the Y-axis direction.

As will be described later, the magnet Mx' is arranged such that different magnetic poles thereof face each of the two magneto-electric transducers HEy1 and HEy2 included in the magnetic sensor Sy. In other words, as illustrated in FIG. 8, the magnetic sensor Sy is arranged so as to face both of the S- and N-poles of the magnet Mx'. In addition, the magnet My' is arranged such that different magnetic poles thereof face each of the two magneto-electric transducers HEx1 and HEx2 included in the magnetic sensor Sx. In other words, as illustrated in FIG. 8, the magnetic sensor Sx is arranged so as to face both of the S- and N-poles of the magnet My'.

Hereinafter, each component of the camera module 200 will be described in detail.

(Magnetic Sensor)

Figure 9:
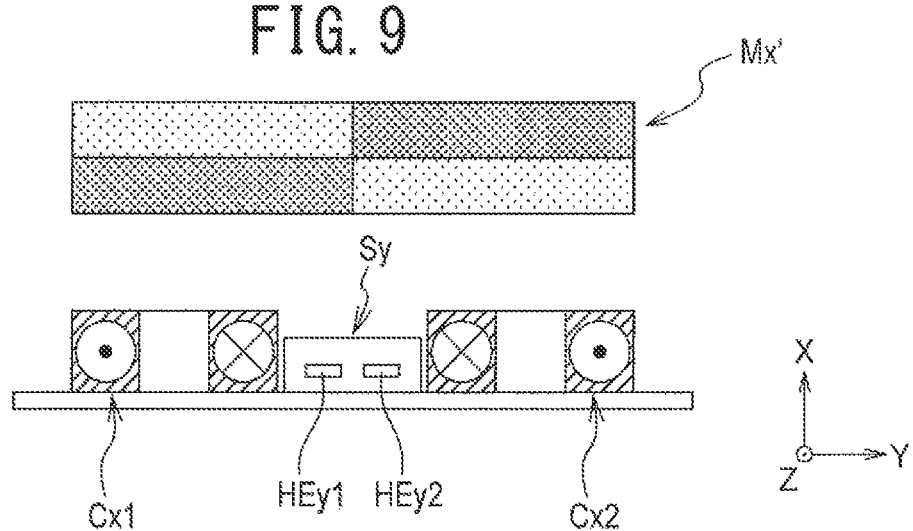
FIG. 9 is a cross-sectional schematic view illustrating the arrangement of a magnet, coils, and a magnetic sensor in the camera module according to the second embodiment of the present disclosure.

FIG. 9 is a cross-sectional view illustrating in detail a positional relationship between the magnet Mx', the coils Cx1 and Cx2, and the magnetic sensor Sy. To facilitate understanding, FIG. 9 illustrates only the magnetic sensor Sy, and omits illustrations of the device 110y including the magnetic sensor Sy and the driver 120y included together with the magnetic sensor Sy in the device 110y.

As illustrated in FIG. 9, the magnetic sensor Sy includes two magneto-electric transducers HEy1 and HEy2 arranged along the Y-axis direction (one example of the second direction). Similarly, the magnetic sensor Sx includes two magneto-electric transducers HEx1 and HEx2 (unillustrated) arranged along the X-axis direction (one example of the first direction).

The magneto-electric transducers HEy1 and HEy2 are arranged such that the sign of an amount of change of a magnetic field detection signal Y1 output by the magneto-electric transducer HEy1 and the sign of an amount of change of a magnetic field detection signal Y2 output by the magneto-electric transducer HEy2 when the magnet Mx' is moved in the Y-axis direction are the same to each other. In this respect, the magneto-electric transducers HEy1 and HEy2 are different from those of the first embodiment.

Figure 10A:
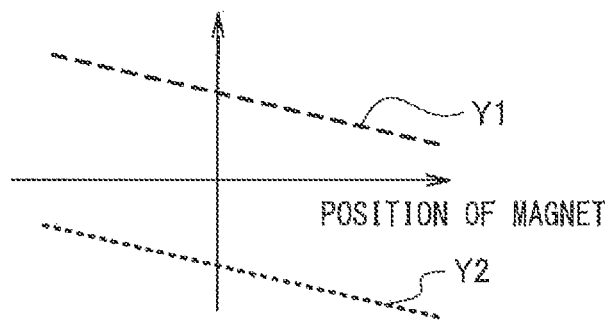
FIG. 10A is a graph illustrating a relationship between a distance of the magnet from a reference position and magnetic fluxes applied to two magneto-electric transducers.

FIG. 10A is a graph illustrating a relationship between the position of the magnet Mx' (a distance of the magnet Mx' from a reference position) and magnetic fields applied to the magneto-electric transducers HEy1 and HEy2. In FIG. 10A, when the distance of the magnet Mx' from the reference position is positive, the magnet Mx' is positioned in the Y-axis negative direction rather than the reference position.

Figure 10B:
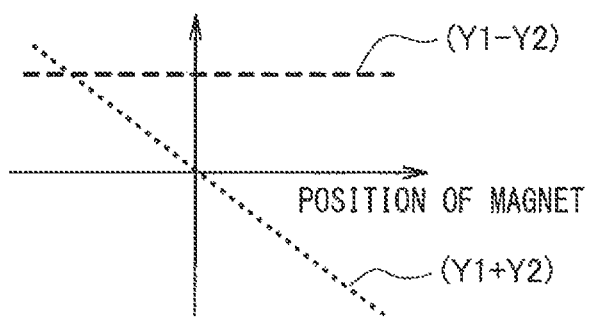
FIG. 10B is a graph illustrating a relationship between the distance of the magnet from the reference position and a sum of and a difference between the magnetic fluxes applied to the two magneto-electric transducers.

Here, in FIG. 10A, a magnetic field detection signal Y1 output by the magneto-electric transducer HEy1 is indicated by a broken line, and a magnetic field detection signal Y2 output by the magneto-electric transducer HEy2 is indicated by a dotted line. In FIG. 10B, a sum signal (Y1+Y2) of the magnetic field detection signal Y1 and the magnetic field detection signal Y2 is indicated by a dotted line, and a difference signal (Y1−Y2) between the magnetic field detection signal Y1 and the magnetic field detection signal Y2 is indicated by a broken line. As illustrated in FIG. 10B, the difference signal (Y1−Y2) is substantially constant regardless of the position of the magnet Mx'. On the other hand, as illustrated in FIG. 10B, the sum signal (Y1+Y2) varies in accordance with the position of the magnet Mx'. Thus, by arranging the magneto-electric transducers HEy1 and HEy2 as in the present embodiment, a position detection signal can be obtained that indicates the position of the magnet Mx' on the basis of a ratio of the sum signal (Y1+Y2) to the difference signal (Y1−Y2) (i.e., (Y1+Y2)/(Y1−Y2)).

Note that the position detection signal can also be obtained on the basis of a signal corresponding to the ratio of the sum signal to the difference signal. For example, with the use of a ratio signal (Y1/Y2) of the magnetic field detection signal Y1 to the magnetic field detection signal Y2, the position detection signal indicating the position of the magnet Mx' can be obtained on the basis of $\{(Y1/Y2)+1\}/\{(Y1/Y2)-1\}$.

Additionally, the magnet My', the magnetic sensor Sx (the magneto-electric transducers HEx1 and HEx2), and the coils Cy1 and Cy2 may be arranged similarly to the magnet Mx', the magnetic sensor Sy (the magneto-electric transducers HEy1 and HEy2), and the coils Cx1 and Cx2 in FIG. 9. In this case, a difference signal (X1−X2) between an output X1 of the magneto-electric transducer HEx1 and an output X2 of the magneto-electric transducer HEx2 is substantially constant regardless of the position of the magnet My'. On the other hand, the sum signal (X1+X2) varies in accordance with the position of the magnet My'. Thus, by arranging the magneto-electric transducers HEx1 and HEx2 as in the present embodiment, a position detection signal can be obtained that indicates the position of the magnet My' on the basis of a ratio of the sum signal (X1+X2) to the difference signal (X1−X2) (i.e., (X1+X2)/(X1−X2)).

Note that the position detection signal can also be obtained on the basis of a signal corresponding to the ratio of the sum signal to the difference signal. For example, with the use of a ratio signal (X1/X2) of the magnetic field detection signal X1 to the magnetic field detection signal X2, the position detection signal indicating the position of the magnet My' can be obtained on the basis of $\{(X1/X2)+1\}/\{(X1/X2)-1\}$.

(Magnet)

The magnets Mx' and My' are quadrupole permanent magnets having two N-poles and two S-poles. The magnet Mx' is a quadrupole permanent magnet in which the N-pole and the S-pole are distributed in a direction perpendicular to a direction in which the two magneto-electric transducers HEy1 and HEy2 are arranged side by side in the magnetic sensor Sy, and also the N-pole and the S-pole are distributed in a direction parallel to the direction in which the two magneto-electric transducers HEy1 and HEy2 are arranged side by side. Additionally, The magnet My' is a quadrupole permanent magnet in which the N-pole and the S-pole are distributed in a direction perpendicular to a direction in which the two magneto-electric transducers HEx1 and HEx2 are arranged side by side in the magnetic sensor Sx, and also the N-pole and the S-pole are distributed in a direction parallel to the direction in which the two magneto-electric transducers HEx1 and HEx2 are arranged side by side. Note that the magnets Mx' and My' are not limited to quadrupole magnets and may be magnets having multipoles other than quadrupole.

As described above, the magnet Mx' is arranged such that the different magnetic poles thereof face each of the two magneto-electric transducers HEy1 and HEy2 included in the magnetic sensor Sy. The magnet My' is arranged such that the different magnetic poles thereof face each of the two magneto-electric transducers HEx1 and HEx2 included in the magnetic sensor Sx.

(Coil)

The two coils Cx1 and Cx2 are arranged away from each other along the Y-axis direction, and the two coils Cy1 and Cy2 are arranged away from each other along the X-axis direction. In other words, The coils are spaced apart from each other along one direction, being arranged such that a winding axis of each of the coils faces a direction perpendicular to the one direction. So they can move the magnet in the direction perpendicular to the one direction.

The coils Cx1 and Cx2 generate magnetic fields by supply of current, and move the magnet Mx' in the X-axis direction. The coils Cy1 and Cy2 generate magnetic fields by supply of current, and move the magnet My' in the Y-axis direction. In other words, the coil Cy can move the magnet My' in the direction different from that of the magnet Mx'.

Figure 11:
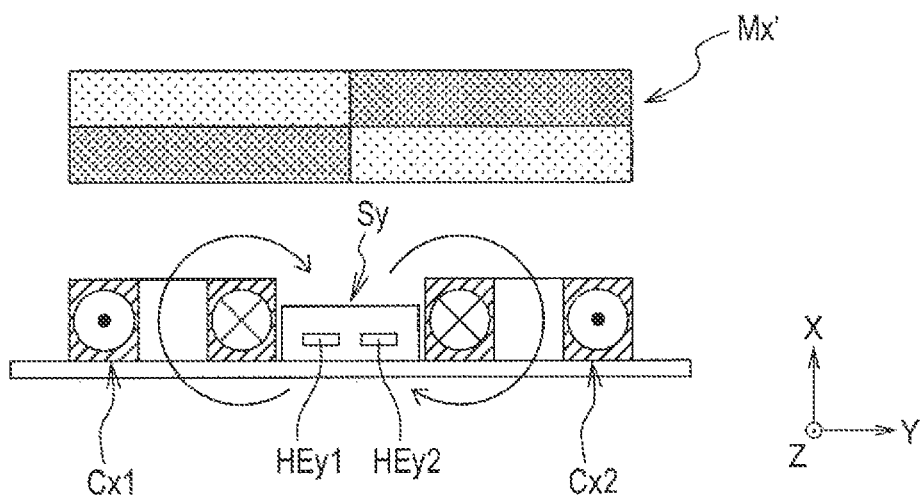
FIG. 11 is a schematic view for describing an effect of the camera module according to the second embodiment of the present disclosure.

FIG. 11 is a cross-sectional view describing the magnetic fields generated by the coils Cx1 and Cx2 with respect to the magnetic sensor Sy. To facilitate understanding, FIG. 11 illustrates only the magnetic sensor Sy, and omits illustrations of the device 110y and the driver 120y.

As illustrated in FIG. 11, the coils Cx1 and Cx2, respectively, are adapted to generate opposite polar magnetic fields with respect to the magnetic sensor Sy. The coils Cx1 and Cx2 preferably generate magnetic fields having magnitudes as equal as possible with respect to the magnetic sensor Sy. As a result, in the position of the magnetic sensor Sy, the magnetic field generated by current flow to the coil Cx1 and the magnetic field generated by current flow to the coil Cx2 are cancelled. This reduces influence of the magnetic fields from the coils Cx1 and Cx2, so that the magnetic sensor Sy can output a signal indicating the position of the magnet Mx' with high accuracy.

To allow the coils Cx1 and Cx2 respectively to generate magnetic fields having opposite polarities with respect to the magnetic sensor Sy, the coils Cx1 and Cx2 are configured in any of the following manners: (i) In the coils Cx1 and Cx2, the winding directions of conductors are the same, but current is applied in opposite directions (see FIG. 11); and (ii) In the coils Cx1 and Cx2, the winding directions of the conductors are opposite, but current is applied in the same direction.

Similarly, the coils Cy1 and Cy2, respectively, are configured to generate magnetic fields having opposite polarities with respect to the magnetic sensor Sx. Thus, in the position of the magnetic sensor Sx, influence of the magnetic fields from the coils Cy1 and Cy2 can be reduced.

To allow the coils Cy1 and Cy2 respectively to generate magnetic fields having opposite polarities with respect to the magnetic sensor Sx, the coils Cy1 and Cy2 are configured as in any of the (i) and (ii) described above.

(Position Detection Signal Generator)

The position detection signal generator 130 according to the second embodiment will be described with reference to FIG. 6. As illustrated in FIG. 6, the position detection signal generator 130 includes the calculator 132 and the detector 138. The position detection signal generator 130 according to the second embodiment outputs the position detection signal Sp(Spy) on the basis of the ratio of the sum signal (Y1+Y2) to the difference signal (Y1−Y2). In this respect, it is different from the position detection signal generator 130 according to the first embodiment.

The detector 138 outputs, for example, the ratio {(Y1+Y2)/(Y1−Y2)} of the sum signal (Y1+Y2) to the difference signal (Y1−Y2) as the position detection signal Spy to the control signal generator 140. As described above, in the present embodiment, the value of the difference signal (Y1−Y2) is substantially constant regardless of the position of the magnet Mx' (see FIG. 10B). Thus, the position detection signal Spy represented by (Y1+Y2)/(Y1−Y2) is a signal that varies in accordance with the position of the magnet Mx' (a relative position with respect to the reference position of the magnet Mx').

[Effects of Second Embodiment]

The camera module 200 according to the second embodiment has, in addition to the effect (1) of the first embodiment, the following effect: (2) The camera module 200 according to the second embodiment includes the two adjacently arranged coils and the magnetic sensor arranged between the two coils and including the two magneto-electric transducers; and additionally, in the camera module 200, the magnet is arranged such that the different magnetic poles thereof face each of the two magneto-electric transducers included in the magnetic sensor. The two coils respectively are adapted to generate magnetic fields having opposite polarities with respect to the magnetic sensor.

As a result, in the position of the magnetic sensor, the influence of the magnetic fields from the two coils can be reduced.

3. Other Embodiments

Hereinafter, other embodiments according to the present disclosure will be described with reference to the drawings.

In the first and second embodiments, the position detection signal generator 130 has output the ratio between the sum signal (Y1+Y2) and the difference signal (Y1−Y2) of the magnetic field detection signals Y1 and Y2, as the position detection signal Sp. However, instead of this, the position detection signal generator 130 may perform calculations as below.

First Example of Other Embodiments

FIG. 12A is a block diagram illustrating a first example of other embodiments. A position detection signal generator 230 illustrated in FIG. 12A is different from the position detection signal generator 130 illustrated in FIG. 6 in that the former includes a calculator 232 instead of the calculator 132 and a detector 238 instead of the detector 138. The position detection signal generator 230 can be applied to the camera module 100 of the first embodiment.

The position detection signal generator 230 includes the calculator 232 and the detector 238.

The calculator 232 includes an amplifier 234a connected to the magneto-electric transducer HEy1 and an amplifier 234b connected to the magneto-electric transducer HEy2. In the amplifiers 234a and 234b, a coefficient (an amplification factor) is calculated such that the sum signal (Y1+Y2) of an output signal of the amplifier 234a and an output signal of the amplifier 234b calculated by an adder 236b is constant. The calculator 232 outputs a difference signal α(Y1−Y2) between an output signal αY1 of the amplifier 234a and an output signal αY2 of the amplifier 234b controlled by an amplification factor α, calculated by a subtractor 236a, to the detector 238.

The detector 238 detects the position of the magnet Mx on the basis of the output (the difference signal α(Y1−Y2)) of the calculator 232. Additionally, the detector 238 outputs the position detection signal Spy of the magnet Mx as the position detection signal Spy to the control signal generator 140. The position detection signal Spy indicates, for example, a relative position from the reference position of the magnet Mx in the Y-axis direction.

The position detection signal generator 230 illustrated in FIG. 12A is replaced by a position detection signal generator 330 when applied to the camera module 200 of the second embodiment.

The position detection signal generator 330 illustrated in FIG. 12B includes a calculator 332 instead of the calculator 132 and a detector 338 instead of the detector 138. In this respect, the position detection signal generator 330 is different from the position detection signal generator 130 illustrated in FIG. 6.

The position detection signal generator 330 includes the calculator 332 and the detector 338.

The calculator 332 includes an amplifier 334a connected to the magneto-electric transducer HEy1 and an amplifier 334b connected to the magneto-electric transducer HEy2. In the amplifiers 334a and 334b, a coefficient (an amplification factor) is calculated such that the difference signal (Y1−Y2) between an output signal of the amplifier 334a and an output signal of the amplifier 334b calculated by a subtractor 336b is constant. The calculator 332 outputs a sum signal α(Y1+Y2) of the output signal αY1 of the amplifier 334a and the output signal αY2 of the amplifier 334b controlled by the amplification factor α, calculated by an adder 336a, to the detector 338.

The detector 338 detects the position of the magnet Mx on the basis of the output (the sum signal α(Y1+Y2)) of the calculator 332. Additionally, the detector 338 outputs the position detection signal Spy of the magnet Mx as the position detection signal Spy to the control signal generator 140. The position detection signal Spy indicates, for example, a relative position from the reference position of the magnet Mx in the Y-axis direction.

Second Example of Other Embodiments

Figures 13A, 13B:
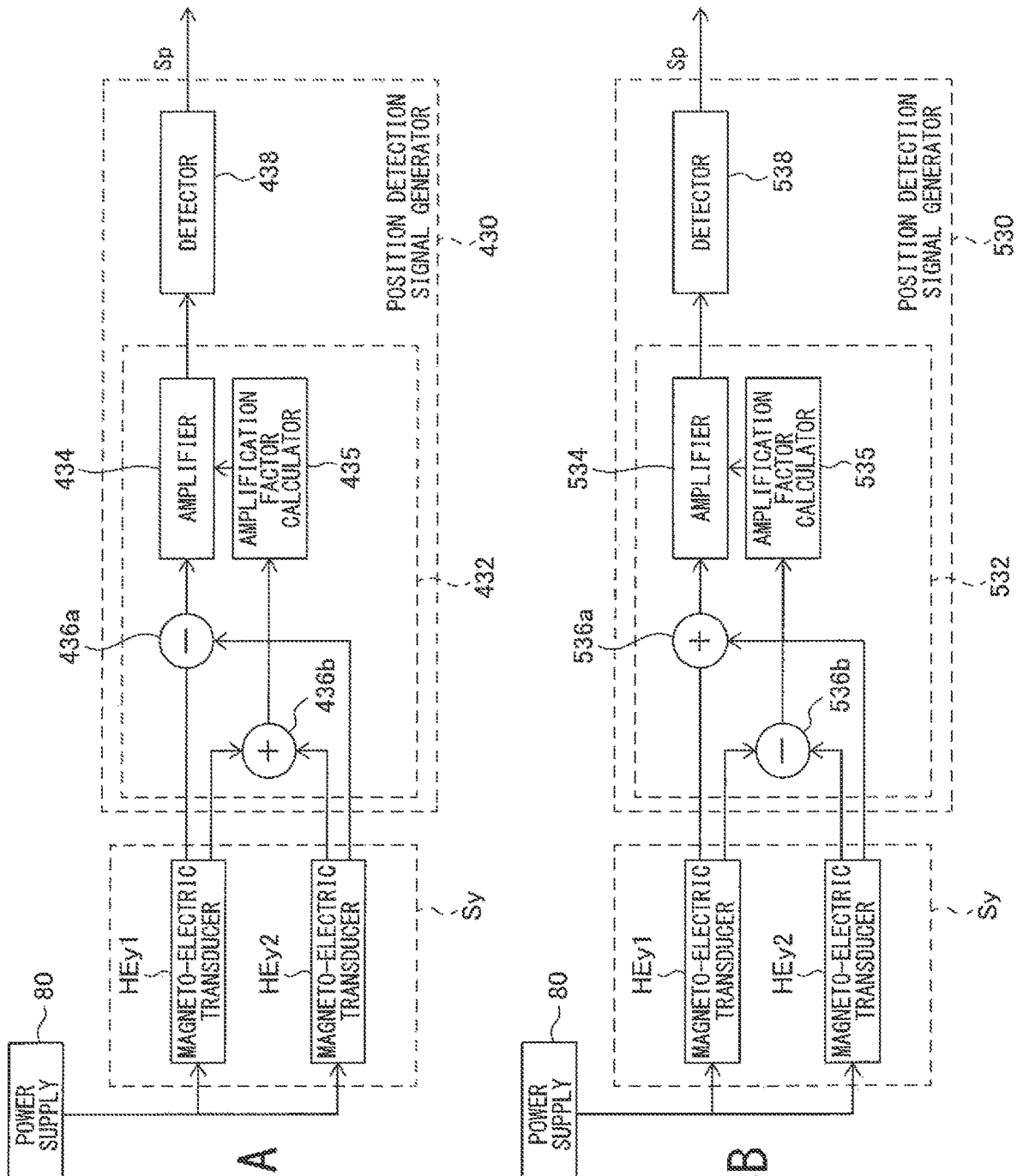
FIGS. 13A and 13B are circuit block diagrams for each describing a camera module according to another embodiment of the present disclosure.

FIG. 13A is a block diagram illustrating a second example of other embodiments. A position detection signal generator 430 illustrated in FIG. 13A is different from the position detection signal generator 130 illustrated in FIG. 6 in that the former includes a calculator 432 instead of the calculator 132 and a detector 438 instead of the detector 138. The position detection signal generator 430 can be applied to the camera module 100 of the first embodiment.

The position detection signal generator 430 includes the calculator 432 and the detector 438.

The calculator 432 inputs the sum signal (Y1+Y2) of the output Y1 from the magneto-electric transducer HEy1 and the output Y2 from the magneto-electric transducer HEy2 calculated by an adder 436b to an amplification factor calculator 435. The amplification factor calculator 435 calculates a coefficient (an amplification factor) such that the sum signal (Y1+Y2) is constant. An amplifier 434 calculates to multiply the difference signal (Y1−Y2) between the output Y1 from the magneto-electric transducer HEy1 and the output Y2 from the magneto-electric transducer HEy2 calculated by a subtractor 436a by an amplification factor β input from the amplification factor calculator 435. The calculator 432 outputs a product β(Y1−Y2) of the difference signal (Y1−Y2) by the amplification factor β as a calculation result to the detector 438.

On the basis of the output of the calculator 432, the detector 438 detects the position of the magnet Mx. Additionally, the detector 438 outputs the position detection signal Spy of the magnet Mx to the control signal generator 140. The position detection signal Spy indicates, for example, a relative position from the reference position of the magnet Mx in the Y-axis direction.

The position detection signal generator 430 illustrated in FIG. 13A is replaced by a position detection signal generator 530 illustrated in FIG. 13B when applied to the camera module 200 of the second embodiment.

The position detection signal generator 530 includes a calculator 532 and a detector 538.

The calculator 532 inputs the difference signal (Y1−Y2) between the output Y1 from the magneto-electric transducer HEy1 and the output Y2 from the magneto-electric transducer HEy2 calculated by a subtractor 536b to an amplification factor calculator 535. The amplification factor calculator 535 calculates a coefficient (an amplification factor) such that the difference signal (Y1−Y2) is constant. An amplifier 534 calculates to multiply the sum signal (Y1+Y2) of the output Y1 from the magneto-electric transducer HEy1 and the output Y2 from the magneto-electric transducer HEy2 calculated by an adder 536a by the amplification factor β input from the amplification factor calculator 535. The calculator 532 outputs a product β(Y1+Y2) of the sum signal (Y1+Y2) by the amplification factor β as a calculation result to the detector 538.

On the basis of the output of the calculator 532, the detector 538 detects the position of the magnet Mx. Additionally, the detector 538 outputs the position detection signal Spy of the magnet Mx to the control signal generator 140. The position detection signal Spy indicates, for example, a relative position from the reference position of the magnet Mx in the Y-axis direction.

Third Example of Other Embodiments

FIG. 14A is a block diagram illustrating a third example of other embodiments. A position detection signal generator 630 illustrated in FIG. 14A is different from the position detection signal generator 130 illustrated in FIG. 6 in that the former includes a calculator 632 instead of the calculator 132 and a detector 638 instead of the detector 138. The position detection signal generator 630 can be applied to the camera module 100 of the first embodiment.

The position detection signal generator 630 includes the calculator 632 and the detector 638.

The calculator 632 calculates the output values of the magnetic sensor Sy such that the sum signal (Y1+Y2) of the output Y1 from the magneto-electric transducer HEy1 and the output Y2 from the magneto-electric transducer HEy2 calculated by an adder 636b is constant. On the basis of a result of the calculation, the calculator 632 controls the power supply 80 to drive the magnetic sensor Sy such that the sum signal (Y1+Y2) is constant.

The position detection signal generator 630 may include a magnetic sensor drive controller (unillustrated) configured to control drive voltage or drive current of the magnetic sensor Sy such that the sum signal (Y1+Y2) of the magnetic sensor Sy is constant. The magnetic sensor drive controller controls the power supply 80 to control the drive voltage or drive current of the magnetic sensor Sy.

The detector 638 detects the position of the magnet Mx on the basis of the difference signal (Y1−Y2) calculated by a subtractor 636a on the basis of the corrected output values Y1 and Y2 from the magnetic sensor Sy. Additionally, the detector 638 outputs the position detection signal Spy of the magnet Mx to the control signal generator 140. The position detection signal Spy indicates, for example, a relative position from the reference position of the magnet Mx in the Y-axis direction.

The position detection signal generator 630 illustrated in FIG. 14A is replaced by a position detection signal generator 730 illustrated in FIG. 14B when applied to the camera module 200 of the second embodiment.

The position detection signal generator 730 includes a calculator 732 and a detector 738.

The calculator 732 calculates the output values of the magnetic sensor Sy such that the difference signal (Y1−Y2) between the output Y1 from the magneto-electric transducer HEy1 and the output Y2 from the magneto-electric transducer HEy2 calculated by a subtractor 736b is constant. On the basis of a result of the calculation, the calculator 732 controls the power supply 80 to drive the magnetic sensor Sy such that the difference signal (Y1−Y2) is constant.

The position detection signal generator 730 may control input values to the magnetic sensor Sy such that the difference signal (Y1−Y2) of the magnetic sensor Sy is constant. In this case, the position detection signal generator 730 may include a magnetic sensor drive controller (unillustrated) configured to control drive voltage or drive current of the magnetic sensor Sy. The magnetic sensor drive controller controls the power supply 80 to control the drive voltage or drive current of the magnetic sensor Sy.

The detector 738 detects the position of the magnet Mx on the basis of the sum signal (Y1+Y2) calculated by an adder 736a on the basis of the corrected output values Y1 and Y2 from the magnetic sensor Sy. Additionally, the detector 738 outputs the position detection signal Spy of the magnet Mx to the control signal generator 140. The position detection signal Spy indicates, for example, a relative position from the reference position of the magnet Mx in the Y-axis direction.

Each of the structures of the position detection signal generators in the first to third examples of the other embodiments has been described hereinabove. However, it is obvious that each example may be performed in the same manner as above by using the outputs X1 and X2 from the magnetic sensor Sx.

While some embodiments of the present disclosure have been described hereinabove, the embodiments depicted above exemplify devices and methods for embodying the technological idea of the present disclosure, in which the technological idea of the present disclosure does not specify the materials, shapes, structures, arrangement, and the like of components. Various modifications can be made to the technological idea of the present disclosure without departing from the technological scope prescribed by the claims.

REFERENCE SIGNS LIST

4: Housing
21: Lens holder
22: Lens
41: Holder mounting portion
80: Power supply
100, 200: Camera module
110, 110x, 110y: Device
120, 120x, 120y: Driver
130: Position detection signal generator
140: Control signal generator
150: Drive signal generator
Sx, Sy: Magnetic sensor
HEx1, HEx2, HEy1, HEy2: Magneto-electric transducer
Mx, My, Mx', My': Magnet
Cx, Cx1, Cx2, Cy, Cy1, Cy2: Coil

The invention claimed is:

1. A camera module, comprising:
a magnet mounted on a mobile body, wherein the magnet is a double-sided quadrupole magnet having two N-poles and two S-poles; and
a coil portion including two coils arranged facing the magnet, the coils being spaced apart from each other along one direction, being arranged such that a winding axis of each of the coils faces a direction perpendicular to the one direction, and moving the magnet in the direction perpendicular to the one direction,
wherein a first N-pole of the two N-poles is located on a first half of a first face of the magnet, and a first S-pole of the two S-poles is located on a second half of the first face of the magnet,
wherein a second N-pole of the two N-poles is located on a first region of a second face of the magnet and facing the first S-pole, and a second S-pole of the two S-poles is located on a second region of the second face of the magnet and facing the first N-pole, where the second face is opposite to the first face,
wherein both of the two coils of the coil portion are arranged facing the magnet on the first side face with respect to the magnet,
wherein the two coils are arranged facing each of magnetic poles of the magnet magnetized to different polarities, and
wherein the two coils drive the double-sided quadrupole magnet in which the two coils are arranged facing each other.

2. The camera module according to claim 1, wherein the magnet is a magnet in which the N-pole and the S-pole are distributed in a direction parallel to the direction in which the two coils are arranged side by side.

3. The camera module according to claim 2, wherein one of the two coils is arranged facing the N-pole and not facing the S-pole, and wherein the other of the two coils is arranged facing the S-pole and not facing the N-pole.

4. The camera module according to claim 1, comprising a magnetic sensor arranged between the two coils and configured to detect a position of the magnet in the one direction.

5. The camera module according to claim 4, wherein the magnetic sensor is arranged between the two coils when viewed from a direction perpendicular to the one direction.

6. The camera module according to claim 5, wherein the magnetic sensor includes two magneto-electric transducers arranged along the one direction, and
wherein the camera module further comprises a position detection signal generator configured to output a position detection signal indicating the position of the magnet on a basis of at least one of a sum signal of, a difference signal between, and a ratio signal between two magnetic field direction signals respectively output by the two magneto-electric transducers.

7. The camera module according to claim 6, wherein the magnet is arranged such that different magnetic poles face each of the two magneto-electric transducers included in the magnetic sensor, and
wherein the position detection signal generator outputs the position detection signal on a basis of a ratio of the sum signal to the difference signal.

8. The camera module according to claim 4, comprising a driver configured to drive the coil portion such that the two coils respectively generate magnetic fields having opposite polarities with respect to the magnetic sensor.

9. The camera module according to claim 8, wherein in the two coils, winding directions of conductors are the same to each other, and
wherein the driver applies current to the two coils in opposite directions to each other.

10. The camera module according to claim 8, wherein in the two coils, winding directions of conductors are opposite to each other, and
wherein the driver applies current to the two coils in the same direction to each other.

11. The camera module according to claim 1, wherein the mobile body include the lens.

12. The camera module according to claim 1, comprising a drive control device, the drive control device including:
a plurality of magneto-electric transducers arranged facing each of magnetic poles magnetized to different polarities of a first magnet arranged on a first side face of the mobile body and detects a magnetic field generated by the first magnet;
an AD converter configured to AD-convert each of magnetic field detection signals respectively output by the plurality of magneto-electric transducers;
a calculator including an adder configured to outputs a sum signal of the plurality of the magnetic field detection signals and a subtractor configured to outputs a difference signal between the plurality of the magnetic field detection signals;
a control signal generator configured to output control signals for moving a second magnet arranged on a second side face intersecting with the first side face of the mobile body on the basis of a position detection signal indicating a position of the magnet in a one direction and a target position signal indicating a target position of the magnet in the one direction, the position detection signal is calculated based on the sum signal and the difference signal; and a drive signal generator configured to output drive signals to a coil arranged on facing a second magnet on the basis of the control signals.

13. The camera module according to claim 1, comprising a lens mounted in the mobile body, wherein an optical axis direction of the lens intersects with the winding axis and the one direction.

14. A drive control device, comprising:
a plurality of magneto-electric transducers arranged facing each of magnetic poles magnetized to different polarities of a first magnet arranged on a first side face of a mobile body and detects a magnetic field generated by the first magnet;
an AD converter configured to AD-convert each of magnetic field detection signals respectively output by the plurality of magneto-electric transducers;
a calculator including an adder configured to outputs a sum signal of the plurality of the magnetic field detection signals and a subtractor configured to outputs a difference signal between the plurality of the magnetic field detection signals;
a control signal generator configured to output control signals for moving a second magnet arranged on a second side face intersecting with the first side face of the mobile body on the basis of a position detection signal indicating a position of the magnet in a one direction and a target position signal indicating a target position of the magnet in the one direction, the position detection signal is calculated based on the sum signal and the difference signal; and
a drive signal generator configured to output drive signals to a coil portion arranged on facing a second magnet on the basis of the control signals.

15. The drive control device according to claim 14, wherein the magneto-electric transducers are hall sensors.

16. The drive control device according to claim 14, wherein the drive signal generator electrically couples to the coil portion including a first coil and a second coil arranged facing the second magnet and configured to generate the magnetic fields having opposite polarities, and
wherein the drive signal generator outputs the control signals to the first coil and the second coil.

17. The drive control device according to claim 14, wherein the calculator includes an amplification factor calculator configured to calculate a coefficient such that the sum signal is constant, and
wherein the calculator outputs a product of the difference signal by the coefficient input from the amplification factor calculator.

18. The drive control device according to claim 14, wherein the calculator includes an amplification factor calculator configured to calculate a coefficient such that the difference signal is constant, and
wherein the calculator outputs a product of the sum signal by the coefficient input from the amplification factor calculator.

19. The drive control device according to claim 14, wherein the drive signal generator outputs the drive signal to the coil portion arranged facing the second magnet arranged on the second side face.

20. The drive control device according to claim 14, wherein the drive control device is arranged between a third coil and a fourth coil, the third coil and the fourth coil are arranged facing the first magnet.

21. A camera module, comprising:
a magnet mounted on a mobile body;
a coil portion including two coils arranged facing the magnet, the coils being spaced apart from each other along one direction, being arranged such that a winding axis of each of the coils faces a direction perpendicular to the one direction, and moving the magnet in the direction perpendicular to the one direction,
a magnetic sensor arranged between the two coils and configured to detect a position of the magnet in the one direction, and
a driver configured to drive the coil portion such that the two coils respectively generate magnetic fields having opposite polarities with respect to the magnetic sensor,
wherein the two coils are arranged facing each of magnetic poles of the magnet magnetized to different polarities.

* * * * *